(12) United States Patent
Huang-Fu et al.

(10) Patent No.: US 11,582,656 B2
(45) Date of Patent: Feb. 14, 2023

(54) 5GSM HANDLING ON INVALID PDU SESSION

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 17/529,095

(22) Filed: Nov. 17, 2021

(65) Prior Publication Data

US 2022/0078679 A1 Mar. 10, 2022

Related U.S. Application Data

(63) Continuation of application No. 16/653,047, filed on Oct. 15, 2019, now Pat. No. 11,212,720.
(Continued)

(51) Int. Cl.
*H04W 36/00* (2009.01)
*H04W 76/10* (2018.01)
(Continued)

(52) U.S. Cl.
CPC ... *H04W 36/0079* (2018.08); *H04W 36/0022* (2013.01); *H04W 76/10* (2018.02); *H04W 88/06* (2013.01)

(58) Field of Classification Search
CPC ......... H04W 36/0022; H04W 36/0079; H04W 76/10; H04W 88/06; H04W 36/14;
(Continued)

(56) References Cited

U.S. PATENT DOCUMENTS 11,064,457 B2  7/2021 Bolle ............... H04W 28/0268
2018/0234876 A1* 8/2018 Jheng ................... H04W 28/26
(Continued)

FOREIGN PATENT DOCUMENTS

WO  WO2017200264 A1  11/2017
WO  WO201847698 A1   3/2018
WO  WO2018153253 A1  8/2018

OTHER PUBLICATIONS

International Search Report and Written Opinion of International Search Authority for PCT/CN2019/111441 dated Jan. 6, 2020 (9 pages).
(Continued)

*Primary Examiner* — Nathan S Taylor
(74) *Attorney, Agent, or Firm* — Imperium Patent Works; Zheng Jin

(57) ABSTRACT

A method of handling invalid PDU session during handover procedure between non-3GPP access and 3GPP access in a mobile communication network is proposed. A UE establishes a PDU session over a first RAT, and then tries to handover the PDU session from the first RAT to a second RAT. However, at the network side, the PDU session over the first RAT does not exist anymore and the network considers the PDU session to be invalid. The network thus sends a PDU session establishment reject message back to the UE, with a 5GSM status message cause value #54 indicating "PDU session does not exist". At the UE side, the PDU session over the first RAT is still valid (e.g., not inactive). In order to resynchronize with the network, the UE performs a PDU session release procedure to release the PDU session over the first RAT.

8 Claims, 4 Drawing Sheets

Related U.S. Application Data

(60) Provisional application No. 62/746,016, filed on Oct. 16, 2018.

(51) Int. Cl.
*H04W 88/06* (2009.01)
*H04W 68/00* (2009.01)

(58) Field of Classification Search
CPC ..... H04W 76/22; H04W 76/34; H04W 68/00; H04W 36/00
See application file for complete search history.

(56) References Cited

U.S. PATENT DOCUMENTS

| | | |
|---|---|---|
| 2019/0090164 A1 | 3/2019 | Ding et al. |
| 2019/0098536 A1* | 3/2019 | Qiao ............... H04W 76/11 |
| 2019/0159157 A1* | 5/2019 | Gupta ............. H04W 60/005 |
| 2019/0357295 A1 | 11/2019 | Kim et al. |
| 2020/0015311 A1* | 1/2020 | Kim ............... H04W 68/005 |
| 2020/0113014 A1* | 4/2020 | Huang-Fu ......... H04W 76/11 |
| 2020/0120589 A1* | 4/2020 | Velev ............. H04W 48/18 |
| 2020/0128450 A1 | 4/2020 | Wang ............. H04W 88/04 |
| 2020/0329404 A1 | 10/2020 | Vikberg .......... H04L 65/1016 |
| 2020/0389830 A1* | 12/2020 | Park ............. H04W 8/08 |
| 2021/0153286 A1 | 5/2021 | Park ............. H04W 28/24 |

OTHER PUBLICATIONS

3GPP TSG-CT WG1 Meeting #111bis C1-184042, Ericsson et al., "Correction for PDU session context", Sophia-Antipolis, France, Jul. 9-13, 2018 (14 pages) *p. 2 line 2-p. 14 line 5*, Jul. 2018.

Taiwan IPO, office action for the TW patent application 108137223 (no English translation is available) dated Aug. 17, 2020 (9 pages).

3GPP TSG-CT WG1 Meeting #111bis C1-184042, Ericsson et al., "Correction for PDU session context", Sophia-Antipolis, France, Jul. 9-13, 2018 (14 pages) *sections 4.8.2.3, 5.5.2.2.3-5.5.2.2.4, 5.5.2.3.1, 6.1.4.1, 6.4.1.3*, Jul. 2018.

China IPO, office action for the Chinese patent application 201980003977.X (no English translation is available) dated Mar. 24, 2022 (5 pages).

China IPO, search report for the Chinese patent application 201980003977.X (no English translation is available) dated Mar. 18, 2022 (3 pages).

3GPP TSG-CT WG1 Meeting #111bis C1-184042, Ericsson et al., "Correction for PDU session context", Sophia-Antipolis, France, Jul. 9-13, 2018 (14 pages).

\* cited by examiner

5GSM HANDLING ON INVALID PDU SESSION

CROSS REFERENCE TO RELATED APPLICATIONS

This application is a continuation, and claims priority under 35 U.S.C. § 120 from nonprovisional U.S. patent application Ser. No. 16/653,047, entitled "5GSM Handling on Invalid PDU Session", filed on Oct. 15, 2019, the subject matter of which is incorporated herein by reference. Application Ser. No. 16/653,047, in turn, claims priority under 35 U.S.C. § 119 from U.S. Provisional Application No. 62/746, 016, entitled "Handling on Invalid PDU Session", filed on Oct. 16, 2018, the subject matter of which is incorporated herein by reference.

TECHNICAL FIELD

The disclosed embodiments relate generally to wireless communication, and, more particularly, to method of 5G session management (5GSM) handling invalid PDU session during handover in next generation mobile communication systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G new radio (NR) systems.

In 5G/NR, a Protocol Data Unit (PDU) session defines the association between the UE and the data network that provides a PDU connectivity service. The PDU session establishment is a parallel procedure of PDN connection (bearer) procedure in 4G/LTE. Each PDU session is identified by a PDU session ID (PSI), and may include multiple QoS flows and QoS rules. Each PDU session can be established via a 5G Access Network (e.g., 3GPP radio access network (RAN), or via a non-3GPP RAN). The network/UE can initiate different PDU session procedures, e.g., PDU session establishment, PDU session modification, and PDU session release. Due to new radio conditions, load balancing, or due to specific service, different handover procedures are used to handover a UE from a source 5G access network node to a target 5G access network. For UE-requested PDU session establishment procedure, if the UE receives a 5G session management (5GSM) status message with cause value #54 "PDU session does not exist" when the UE tries to handover a PDU session between 3GPP and non-3GPP access, UE behavior is not specified.

A solution is sought.

SUMMARY

A method of handling invalid PDU session during handover procedure between non-3GPP access and 3GPP access in a mobile communication network is proposed. A UE registers with the network over both 3GPP access type and non-3GPP access types, establishes a PDU session over a first RAT, and then tries to handover the PDU session from the first RAT to a second RAT. However, at the network side, the PDU session over the first RAT does not exist anymore and the network considers the PDU session to be invalid. The network thus sends a PDU session establishment reject message back to the UE, with a 5GSM status message cause value #54 indicating "PDU session does not exist". At the UE side, the PDU session over the first RAT is still valid (e.g., not inactive). In order to resynchronize with the network, the UE performs a PDU session release procedure to release the PDU session over the first RAT.

In one embodiment, a UE establishes a protocol data unit (PDU) session in a mobile communication network. The PDU session having a PDU session ID (PSI) is established over a first radio access technology (RAT) access type. The UE initiates a PDU session handover procedure to hand over the PDU session from the first RAT access type to a second RAT access type. The UE receives a 5G session management (5GSM) cause value from the network indicating that the PDU session does not exist. The UE releases the PDU session over the first RAT access type when determining that the PDU session is not inactive at the UE side.

In another embodiment, a UE establishes a protocol data unit (PDU) session in a mobile communication network. The PDU session having a PDU session ID (PSI) is established over a first radio access technology (RAT) access type. The UE initiates a PDU session handover procedure to hand over the PDU session from the first RAT access type to a second RAT access type. The UE receives a 5G session management (5GSM) cause value from the network indicating that the PDU session does not exist. The UE transmits a PDU session establishment request message over the first RAT access type. The PDU session establishment request message indicates a type of "existing PDU session" and the PSI.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
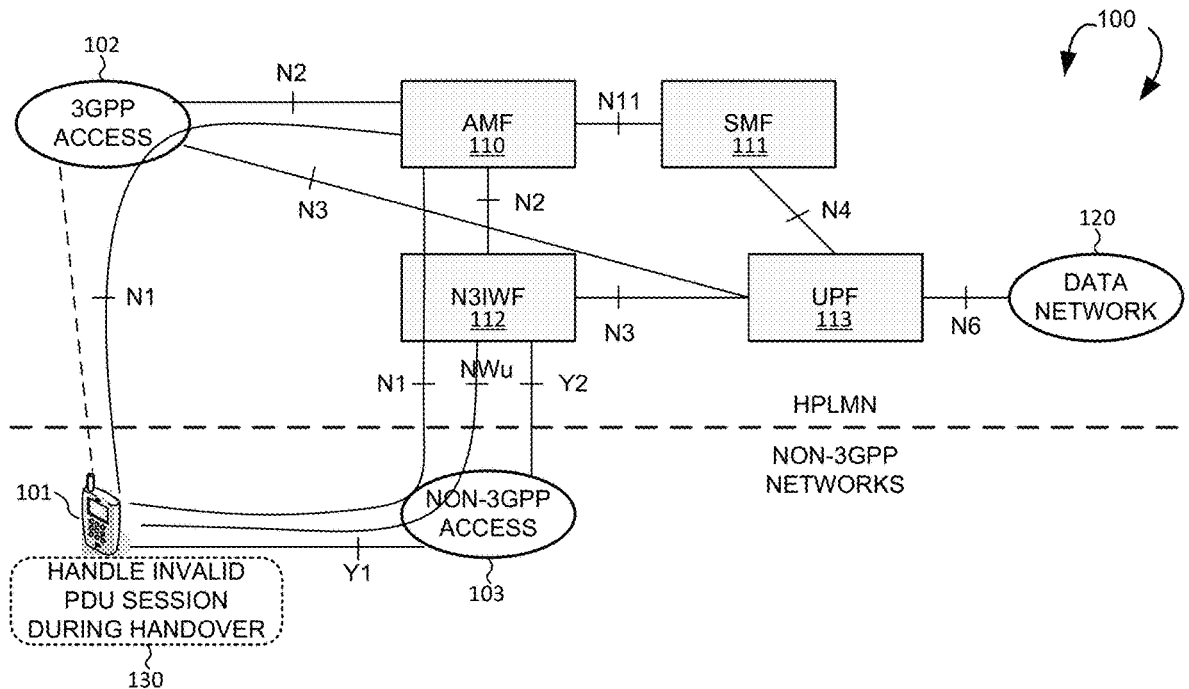
FIG. 1 illustrates an exemplary next generation system with multiple radio access networks and data network and a user equipment (UE) handling invalid PDU session during handover procedure between non-3GPP access and 3GPP access in accordance with one novel aspect.

FIG. 1 illustrates an exemplary next generation system 100 with multiple radio access networks and data network and a user equipment (UE) 100 handling invalid PDU session during handover procedure between non-3GPP access and 3GPP access in accordance with one novel aspect. Next generation 5G New Radio (NR) system 100 comprises UE 101, a 3GPP radio access network RAN 102, a non-3GPP radio access network RAN 103, an Access and Mobility Management Function (AMF) 110, a Session Management Function (SMF) 111, an N3 Interworking Function (N3IWF) 112, a User Plane Function (UPF) 113, and a data network 120. The AMF communicates with the BS, SMF and UPF for access and mobility management of wireless access devices in mobile communication network 100. The SMF is primarily responsible for interacting with the decoupled data plane, creating, updating and removing Protocol Data Unit (PDU) sessions and managing session context with the UPF. The N3IWF interfaces to 5G core network control plane functions, responsible for routing messages outside 5G RAN.

3GPP Radio access network RAN 102 may include base stations (gNBs or eNBs) providing radio access for UE 101 via various 3GPP radio access technologies (RATs) including 5G, 4G, and 3G/2G. Non-3GPP radio access network RAN 103 may include access points (APs) providing radio access for UE 101 via non-3GPP RAT including WiFi. UE 101 can obtain access to data network 120 through 3GPP access 102, AMF 110, SMF 111, and UPF 113. UE 101 can obtain access to data network 120 through non-3GPP access 103, N3IWF 112, AMF 110, SMF 111, and UPF 113. UE 101 may be equipped with a single radio frequency (RF) module or transceiver or multiple RF modules or transceivers for services via different RATs/CNs. UE 101 may be a smart phone, a wearable device, an Internet of Things (IoT) device, a tablet, etc.

In 5G/NR, a Protocol Data Unit (PDU) session defines the association between the UE and the data network that provides a PDU connectivity service. Each PDU session can be established via a 3GPP RAN, or via a non-3GPP RAN. 5G Session management (5GSM) for PDU sessions over both 3GPP access and non-3GPP access are managed by AMF and SMF via NAS signaling. Due to new radio conditions, load balancing, or due to specific service, different handover procedures can be used to handover a UE from a source NG-RAN node to a target NG-RAN node. Specifically, the handover procedures to hand over the PDU session between non-3GPP access and 3GPP access can be triggered by the network using a service request (SR) procedure, or triggered by the UE via a Mobile-originated (MO) PDU session establishment procedure. For UE-requested PDU session establishment procedure, if the UE receives a 5G session management (5GSM) status message with cause value #54 "PDU session does not exist" when the UE tries to handover a PDU session between 3GPP and non-3GPP access, UE behavior is not specified.

In accordance with one novel aspect, a method for handling invalid PDU session during handover procedure in a next generation NG/5G system is proposed. In the example of FIG. 1, UE 101 registers with the network (e.g., through AMF 110) via NAS signaling over both 3GPP access 102 and non-3GPP access 103. UE 101 then establishes a PDU session with the network over non-3GPP access 103. The PDU session is identified by a PSI value (e.g., PSI=1), and has certain parameters. Later, due to various reasons, UE 101 wants to handover the PDU session to 3GPP access by sending a PDU session establishment request message to the network over 3GPP access 102. However, UE 101 receives a PDU session establishment reject message from the network, with a 5GSM status cause value #54 "PDU session does not exist". In response, UE 101 releases the PDU session (either locally or explicitly) over the non-3GPP access where the PDU session with PSI=1 is not inactive at the UE side, to synchronize with the network side. UE 101 may then initiate another PDU session establishment procedure over the target access type (e.g., 3GPP access) using the same PDU session parameters. As a result, the old PDU session with PSI=1 over non-3GPP access type is released and inactive at both UE side and network side, and a new PDU session having the same PDU session parameters over 3GPP access type is established. The same procedure can be applied when the source access type is 3GPP and the target access type is non-3GPP.

Figure 2:
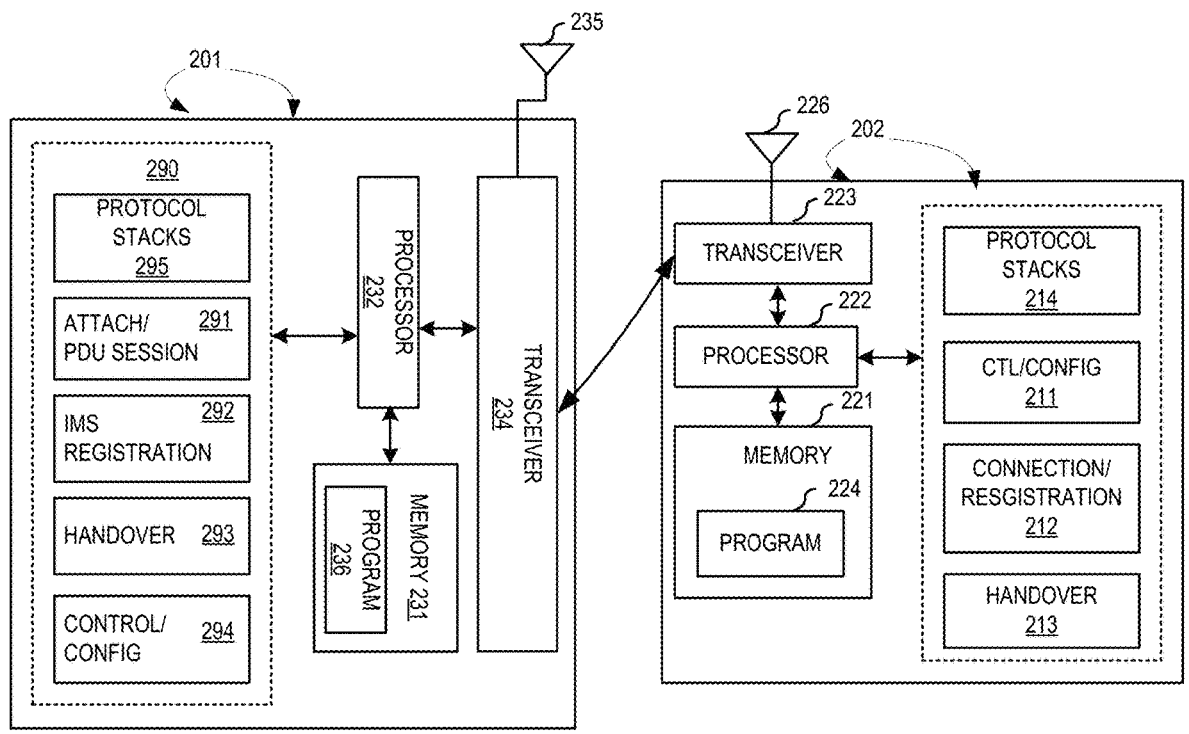
FIG. 2 illustrates simplified block diagrams of a user equipment (UE) and a base station (BS) in accordance with embodiments of the current invention.

FIG. 2 illustrates simplified block diagrams of a user equipment UE 201 and a base station BS 202 in accordance with embodiments of the current invention. BS 202 may have an antenna 226, which may transmit and receive radio signals. RF transceiver module 223, coupled with the antenna, may receive RF signals from antenna 226, convert them to baseband signals and send them to processor 222. RF transceiver 223 may also convert received baseband signals from processor 222, convert them to RF signals, and send out to antenna 226. Processor 222 may process the received baseband signals and invoke different functional modules to perform features in BS/AP 202. Memory 221 may store program instructions and data 224 to control the operations of BS 202. BS 202 may also include a set of functional modules and control circuits, such as a control and configuration circuit 211 for providing control and configuration parameters to UE, a connection and registration handling circuit 212 for establish PDU sessions and registration with UE, and a handover circuit 213 for sending handover commands to UE.

Similarly, UE 201 has an antenna 235, which may transmit and receive radio signals. RF transceiver module 234, coupled with the antenna, may receive RF signals from antenna 235, convert them to baseband signals and send them to processor 232. RF transceiver 234 may also convert received baseband signals from processor 232, convert them to RF signals, and send out to antenna 235. Processor 232 may process the received baseband signals and invoke different functional modules to perform features in the UE 201. Memory 231 may store program instructions and data 236 to control the operations of the UE 201. UE 201 may also include a set of function modules and control circuits 290 that may carry out functional tasks of the present invention. Protocol stacks 295 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. An attach and PDU session handing circuit 291 may attach to the network and establish PDU sessions with serving base station, an IMS registration circuit 292 may perform IMS registration with IMS server, a handover circuit 293 may trigger and handle PDU session handover procedure, and a control and configuration circuit 294 for detecting 5GSM status and deciding what to do when UE initiated PDU session handover procedure is rejected by the network with invalid PDU session.

The various function modules and control circuits may be implemented and configured by software, firmware, hardware, and combination thereof. The function modules and circuits, when executed by the processors via program instructions contained in the memory, interwork with each other to allow the base station and UE to perform embodiments and functional tasks and features in the network. Each module or circuit may comprise a processor (e.g., 222 or 232) together with corresponding program instructions. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201 and BS 202.

Figure 3:
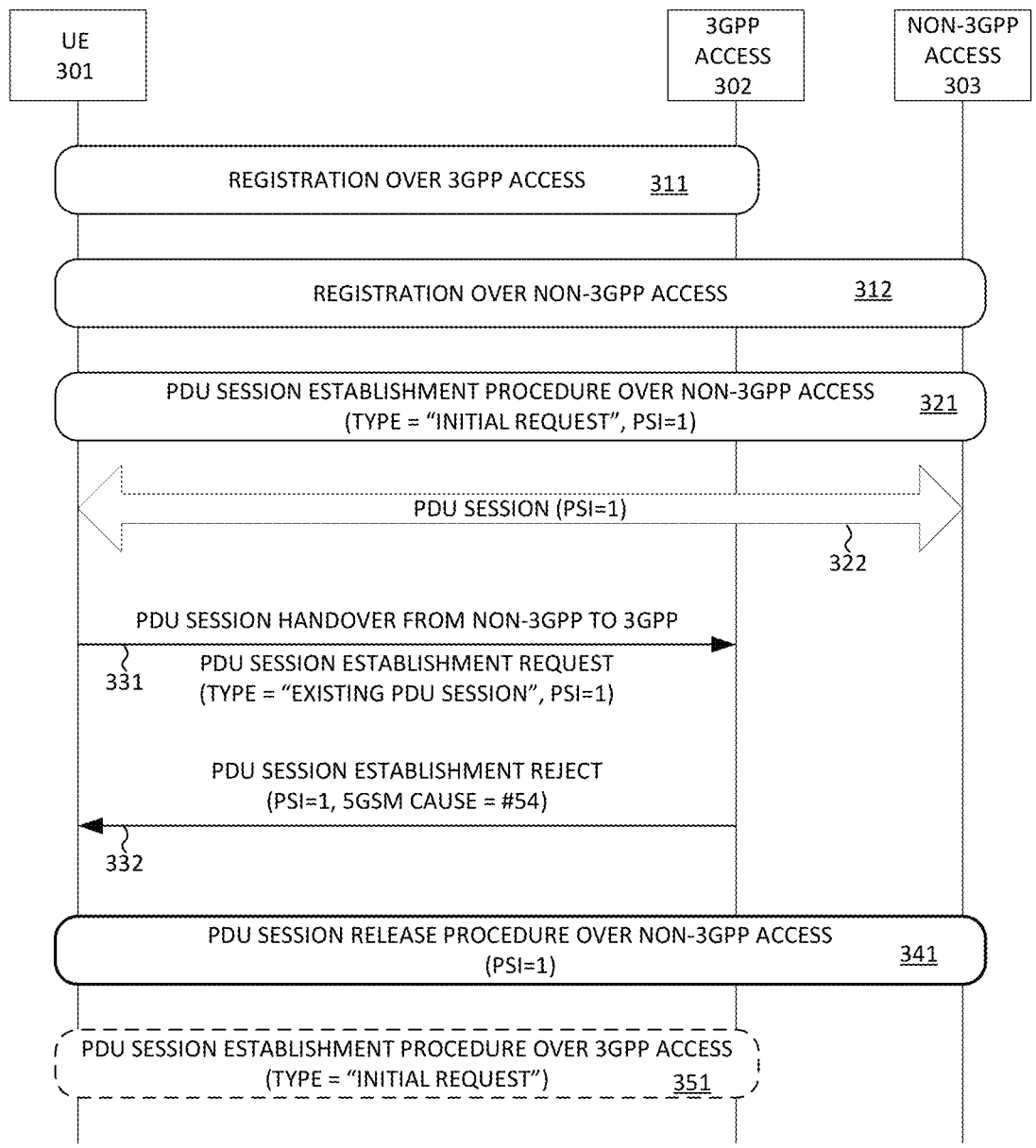
FIG. 3 illustrates a first embodiment of a method for handling invalid PDU session during handover procedure between non-3GPP access and 3GPP access in accordance with embodiments of the current invention.

FIG. 3 illustrates a first embodiment of a method for handling invalid PDU session during handover procedure between non-3GPP access and 3GPP access in accordance with embodiments of the current invention. In step 311, UE 301 performs registration and attaches to the network over 3GPP access 302 via NAS signaling (N1 interface). In step 312, UE 301 performs registration and attaches to the network over non-3GPP access 303 via NAS signaling (N1 interface). In step 321, UE 301 establishes a PDU session over non-3GPP access 303 via NAS signaling. The non-3GPP access network can be a WLAN served by a WiFi AP. In one example, UE 301 sends a PDU session establishment request message to the network, with TYPE="Initial Request". If the PDU session is successfully established, the UE NAS layer indicates the attributes of the established PDU session (e.g., PDU session ID, Service and Session Continuity (SSC) mode, Single-Network Slice Selection Assistance Information (S-NSSAI), Data Network Name (DNN), PDU session type, access type, PDU address) to the URSP handling layer, and provides information (e.g., PDU address) of the established PDU session to the upper layers. Here, the PDU session is identified by PSI=1 with access type=non-3GPP. In step 322, UE 301 communicates with the data network using the established PDU session.

Later, UE 301 has decided that a handover of the PDU session from non-3GPP access to 3GPP access is needed, e.g., due to poor radio signal quality. In step 331, UE 301 initiates a PDU session handover procedure from non-3GPP to 3GPP, by sending a PDU session establishment request message to the network over the 3GPP access 302, with TYPE="existing PDU session" and PSI=1. However, at the network side, the PDU session with PSI=1 over non-3GPP access does not exist anymore and the network considers the PDU session to be invalid. In step 332, the network sends a PDU session establishment reject message back to UE 301, with PSI=1 and a 5GSM cause value #54 indicating "PDU session does not exist". At the UE side, the PDU session with PSI=1 over non-3GPP is still valid (e.g., not inactive). In order to resync with the network, in step 341, UE 301 performs a PDU session release procedure over the non-3GPP access 303, e.g., by sending a PDU session release request message to the network to release the PDU session with PSI=1 over the non-3GPP access type. Alternatively, UE 301 may locally release the PDU session with PSI=1. In step 351, UE 301 may optionally initiate a PDU session establishment procedure on the target access type (e.g., 3GPP access 302) using the same parameters such as PSI, DNN, S-NSSAI, for example. However, it is to be noted that, for this PDU session establishment procedure in step 351, UE 301 may not use the same PSI as that of the prior PDU session.

Figure 4:
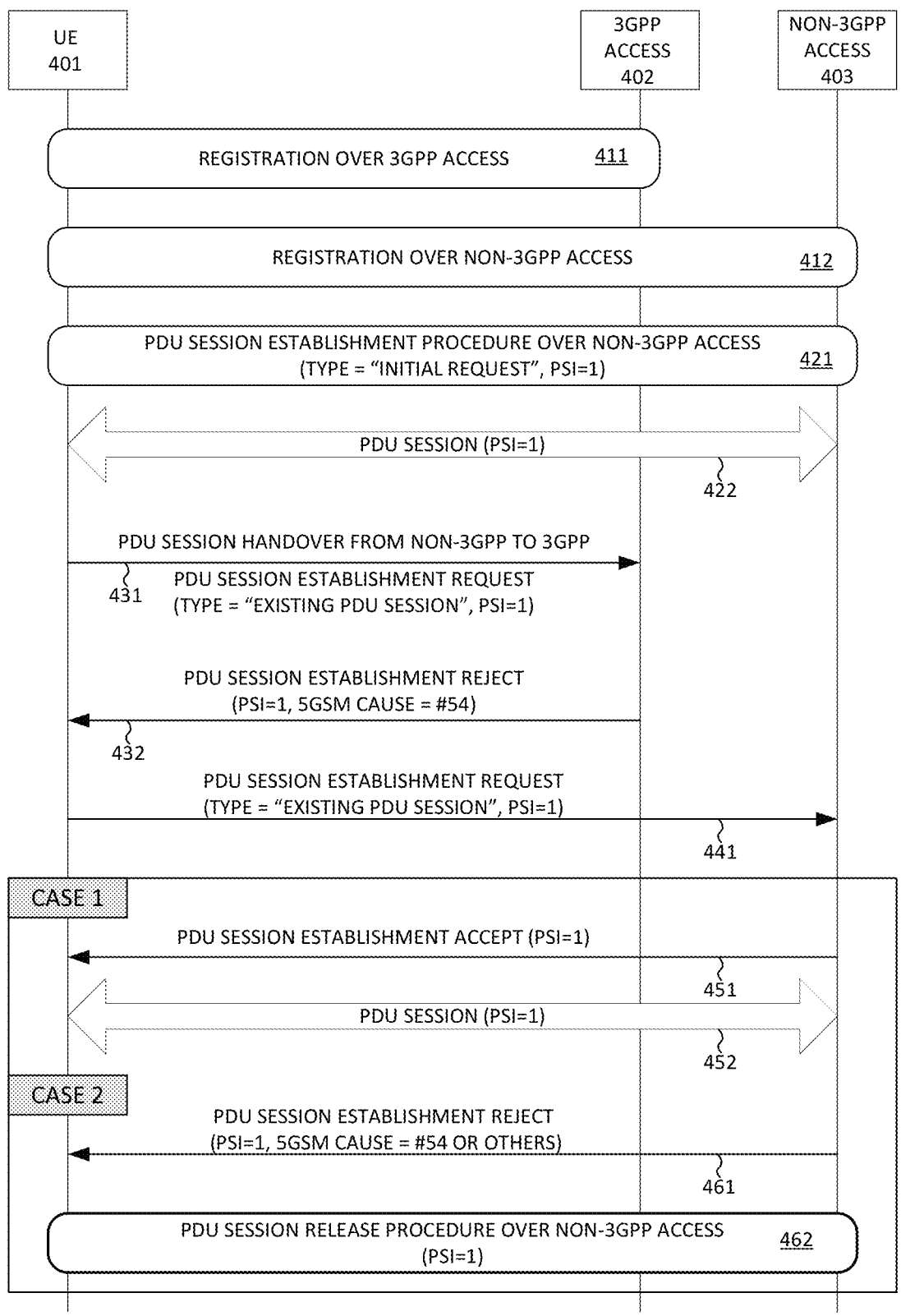
FIG. 4 illustrates a second embodiment of a method for handling invalid PDU session during handover procedure between non-3GPP access and 3GPP access in accordance with embodiments of the current invention.

FIG. 4 illustrates a second embodiment of a method for handling invalid PDU session during handover procedure between non-3GPP access and 3GPP access in accordance with embodiments of the current invention. Steps 411 to 432 of FIG. 4 is similar to steps 311 to 332 of FIG. 3, where the UE registers with the network over both 3GPP access type and non-3GPP access types, establishes a PDU session with PSI=1 over the non-3GPP access type, and then tries to handover the PDU session from non-3GPP access type to 3GPP access type. However, at the network side, the PDU session with PSI=1 over non-3GPP access does not exist anymore and the network considers the PDU session to be invalid. The network sends a PDU session establishment reject message back to the UE, with PSI=1 and a 5GSM cause value #54 indicating "PDU session does not exist". At the UE side, the PDU session with PSI=1 over non-3GPP is still valid (e.g., not inactive).

In the embodiment of FIG. 4, instead of releasing the PDU session over the non-3GPP access type, UE 401 will first try to recover the PDU session. Therefore, in step 441, UE 401 sends a PDU session establishment request message to the network over the non-3GPP access, with TYPE="existing PDU session", and PSI=1. In a first scenario (CASE 1), in step 451, UE 401 receives a PDU session establishment accept message from the network, and the old PDU session over non-3GPP access is successfully recovered. In step 452, UE 401 communicates with the data network using the established PDU session. In a second scenario (CASE 2), in step 461, UE 401 receives a PDU session establishment reject message, with PSI=1 and a 5GSM status message cause value #54 indicating "PDU session does not exist" or other cause values. In order to resync with the network, in step 462, UE 401 performs a PDU session release procedure over the non-3GPP access 403, e.g., by sending a PDU session release request message to the network to release the PDU session with PSI=1 over the non-3GPP access type. Alternatively, UE 401 may locally release the PDU session. UE 401 may optionally initiate a PDU session establishment procedure on the target access type (e.g., 3GPP access type) using the same parameters such as PSI, DNN, S-NSSAI, for example. However, it is to be noted that, for this PDU session establishment procedure, UE 401 may not use the same PSI as that of the prior PDU session.

Figure 5:
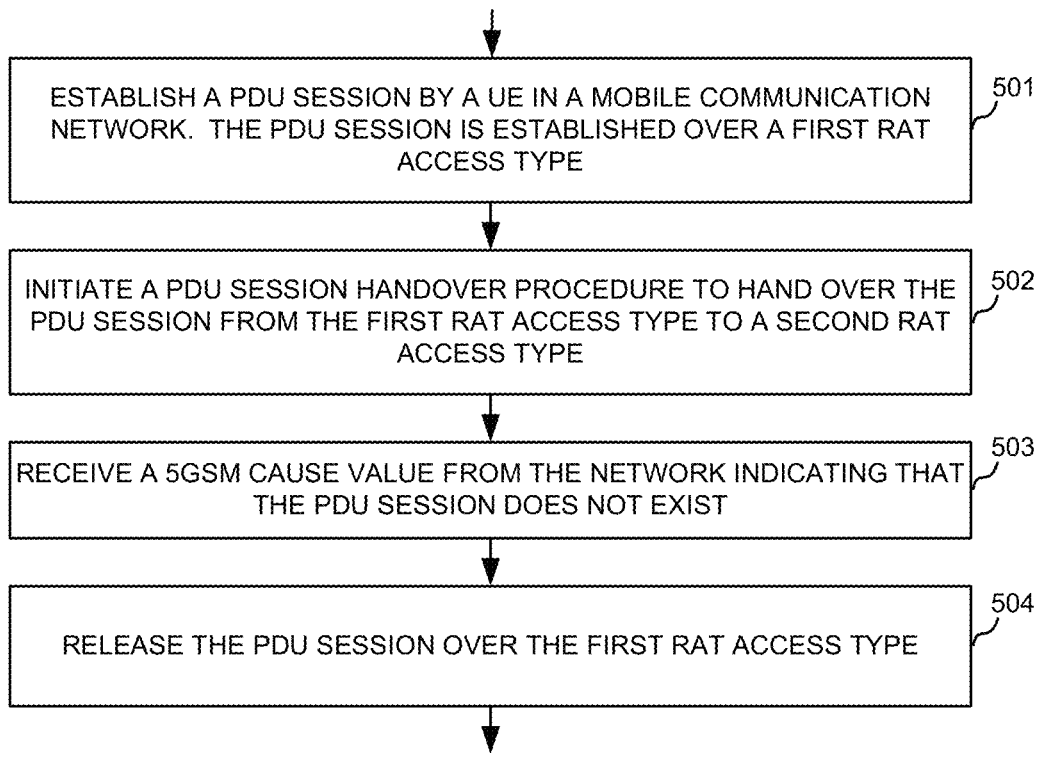
FIG. 5 is a flow chart of a first embodiment of a method of handling invalid PDU session during handover procedure between non-3GPP access and 3GPP access in accordance with a novel aspect.

FIG. 5 is a flow chart of a first embodiment of a method of handling invalid PDU session during handover procedure between non-3GPP access and 3GPP access in accordance with a novel aspect. In step 501, a UE establishes a protocol data unit (PDU) session in a mobile communication network. The PDU session having a PDU session ID (PSI) is established over a first radio access technology (RAT) access type. In step 502, the UE initiates a PDU session handover procedure to hand over the PDU session from the first RAT access type to a second RAT access type. In step 503, the UE receives a 5G session management (5GSM) cause value from the network indicating that the PDU session does not exist. In step 504, the UE releases the PDU session over the first RAT access type when determining that the PDU session is not inactive at the UE side.

Figure 6:
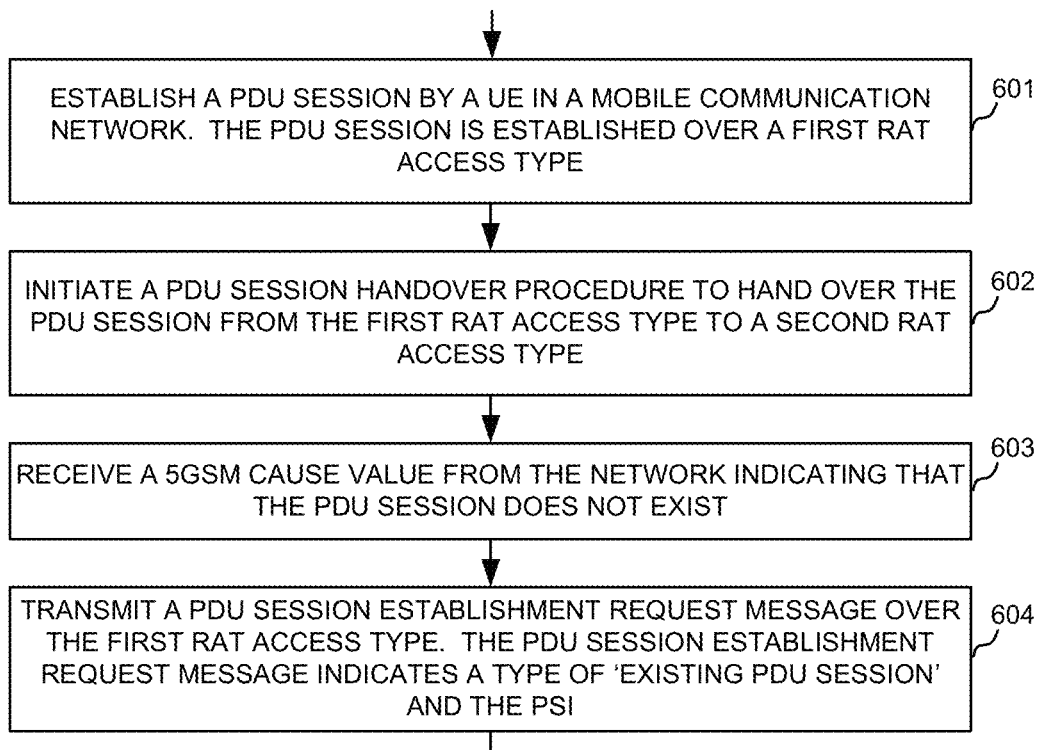
FIG. 6 is a flow chart of a second embodiment of a method of handling invalid PDU session during handover procedure between non-3GPP access and 3GPP access in accordance with a novel aspect.

FIG. 6 is a flow chart of a second embodiment of a method of handling invalid PDU session during handover procedure between non-3GPP access and 3GPP access in accordance with a novel aspect. In step 601, a UE establishes a protocol data unit (PDU) session in a mobile communication network. The PDU session having a PDU session ID (PSI) is established over a first radio access technology (RAT) access type. In step 602, the UE initiates a PDU session handover procedure to hand over the PDU session from the first RAT access type to a second RAT access type. In step 603, the UE receives a 5G session management (5GSM) cause value from the network indicating that the PDU session does not exist. In step 604, the UE transmits a PDU session establishment request message over the first RAT access type. The PDU session establishment request message indicates a type of "existing PDU session" and the PSI.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    establishing a protocol data unit (PDU) session by a user equipment (UE) in a mobile communication network, wherein the PDU session having a PDU session ID (PSI) and PDU session parameters is established over a first radio access technology (RAT) access type;
    initiating a PDU session handover procedure to hand over the PDU session from the first RAT access type to a second RAT access type, wherein the first access type is non-3GPP and the second access type is 3GPP, or wherein the first access type is 3GPP and the second access type is non-3GPP;
    receiving a 5G session management (5GSM) cause value from the network indicating that the PDU session does not exist;
    in response to the receiving the 5GSM cause value, locally releasing the PDU session over the first RAT access type to re-synchronize the PDU session state over the first RAT access type with the network; and
    initiating a PDU session establishment procedure using the same PDU session parameters including a data network name (DNN) and Single-Network Slice Selection Assistance Information (S-NSSAI).

2. The method of claim 1, wherein the UE initiates the PDU session handover procedure by sending a PDU session establishment request message to the network.

3. The method of claim 2, wherein the PDU session establishment request message indicates a type of existing PDU session and the PSI.

4. The method of claim 1, wherein the 5GSM cause value is carried by a PDU session establishment reject message from the network.

5. A User Equipment (UE), comprising:
    a protocol data unit (PDU) handling circuit that establishes a PDU session in a mobile communication network, wherein the PDU session having a PDU session ID (PSI) and PDU session parameters is established over a first radio access technology (RAT) access type;
    a handover circuit that initiates a PDU session handover procedure to hand over the PDU session from the first RAT access type to a second RAT access type, wherein the first access type is non-3GPP and the second access type is 3GPP, or wherein the first access type is 3GPP and the second access type is non-3GPP; and
    a receiver that receives a 5G session management (5GSM) cause value from the network indicating that the PDU session does not exist, wherein the UE in response to the 5GSM cause value, locally releases the PDU session over the first RAT access type to re-synchronize the PDU session state over the first RAT access type with the network, and wherein the UE initiates a PDU session establishment procedure using the same PDU session parameters including a data network name (DNN) and Single-Network Slice Selection Assistance Information (S-NSSAI).

6. The UE of claim 5, wherein the UE initiates the PDU session handover procedure by sending a PDU session establishment request message to the network.

7. The UE of claim 6, wherein the PDU session establishment request message indicates a type of existing PDU session and the PSI.

8. The UE of claim 5, wherein the 5GSM cause value is carried by a PDU session establishment reject message from the network.

* * * * *